United States Patent [19]
Abbes et al.

[11] 3,917,294
[45] Nov. 4, 1975

[54] FLEXIBLE ANNULAR SEAL

[75] Inventors: Claude Abbes, St. Etienne; Jean Fages, Pierrelatte; Georges Mengus, Grillon; Christian Rouaud, Pierrelatte; Raymond de Villepoix, Dunzere, all of France

[73] Assignee: Commissariat a l'Energie Atomique, Paris, France

[22] Filed: May 7, 1974

[21] Appl. No.: 467,742

[30] Foreign Application Priority Data
May 29, 1973 France .................. 73.19488

[52] U.S. Cl. ................... 277/180; 277/236
[51] Int. Cl.² ........................ F16J 15/00
[58] Field of Search ....... 277/164, 163, 235 B, 236, 277/180, 231, 203

[56] References Cited
UNITED STATES PATENTS

| | | | |
|---|---|---|---|
| 2,339,479 | 1/1944 | McCreary | 277/180 |
| 2,359,118 | 9/1944 | Johnston | 277/180 |
| 3,406,979 | 10/1968 | Weber | 277/164 X |
| 3,820,799 | 6/1974 | Abbes et al. | 277/164 |

Primary Examiner—Samuel B. Rothberg
Attorney, Agent, or Firm—Cameron, Kerkam, Sutton, Stowell & Stowell

[57] ABSTRACT

The annular seal comprises a core consisting of a helical spring of wire with contiguous turns under high axial compressive stress and having the shape of a torus in the state of rest, a first sheath of hard and resilient metal which surrounds the spring and has in the state of rest the shape of a toric surface having a generating circle which is not completely closed, a second sheath of ductile metal which surrounds the first sheath and also has in the state of rest the shape of a toric surface whose generating circle has a break in continuity, and a rigid metallic reinforcement strip mounted against the spring inside the first sheath.

6 Claims, 3 Drawing Figures

FLEXIBLE ANNULAR SEAL

U.S. Patent application Ser. No. 280,952 of Aug. 16th, 1972 now U.S. Pat. No. 3,820,799 of June 28, 1974 relates to a flexible metallic annular seal which is capable of providing a very high degree of leak-tightness between two bearing elements by virtue of properties of compression and elastic deformation which are very similar to the properties of elastomer materials. To this end, said seal essentially comprises a core which is constituted by a helical spring of wire having contiguous turns and providing a high axial compressive force while being completely closed and having the shape of a torus in the state of rest, a first sheath of hard and resilient metal which surrounds the spring and has in the state of rest the shape of a toric surface having a generating circle which is not completely closed, and a second sheath of ductile metal which surrounds the first sheath and also has in the state of rest the shape of a toric surface whose generating circle has a break in continuity.

The seal which is thus formed can have a closed circular contour or a contour formed of rectilinear portions joined to each other by curvilinear portions.

The fact that it is possible to produce a seal having very large diametrical dimensions constitutes one of the essential advantages of the seal according to the invention and this latter permits a leak-tight connection between the bearing faces of coupling-flanges or the like which have a very ordinary state of surface. Moreover, and by virtue of an improvement made in said seal and described in particular in patent application Ser. No. 453,069 filed Mar. 20, 1974 and now abandoned it is proposed to cover the second sheath with a third surface sheath of very small thickness and formed of material having a low coefficient of friction such as Teflon, for example. Thus the seal is capable of adaptation to dimensional tolerances which are not usually permissible when machining grooves for accommodating seals; and in order to achieve the same standard of leak-tightness, the flanges do not need to be subjected to a clamping force of appreciably higher value than the force which has to be applied in the case of a perfectly machined state of surface.

In some practical designs and especially when due consideration has to be given to ease of manufacture and handling of the seal when this latter has large dimensions, it is preferable to ensure that the diameter of the tori forming the different sheaths and the internal spring increases in proportion to the nominal diameter of the seal. It is readily apparent that, by overdimensioning the crosssectional area of the seal in this manner, it is consequently necessary in order to obtain satisfactory contact over the entire periphery of the seal to increase the width of seating in the groove walls of the first flange which accommodates said seal and in the opposite face of the second flange which is intended to be applied against the first.

The present invention relates to an improvement which has been made in the seal described in the prior patent cited earlier with a view to improving the conditions in which transverse deformation of the seal takes place at the time of clamping of this latter between the contact surfaces, this being achieved by fitting a rigid bearing member against which the internal spring of said seal is applied.

To this end, the improvement under consideration essentially consists in mounting a rigid metallic reinforcement strip against the spring within the interior of the first sheath.

Depending on requirements, the rigid reinforcement strip is mounted either inside or outside the spring. Moreover, the rigid reinforcement strip may be continuous and extends in this case over the entire length of the seal or may on the contrary be non-continuous and have more or less extensive local breaks in continuity.

In all cases, the rigid reinforcement strip has a diameter or a thickness of smaller value than the diameter of the seal. In consequence, the strip permits partial flattening of the seal by compression until a tangential contact is produced between the ovalized cross-section of the spring under the action of the clamping force and the reinforcement strip itself which is subjected to only negligible deformation by virtue of its inherent rigidity.

By virtue of the presence of the rigid reinforcement strip, the diagram in which the displacement of the spring in compression is plotted as a function of the applied force shows that, at the time of removal of said force and as a result of the contact between the reinforcement strip and the spring, there is a portion of straight line having zero recovery which appears before the elastic recovery takes place. This portion of straight line makes it possible in particular to extend the range of use of the flexible seal. Accordingly, without undergoing any excessive deformation, said seal is capable of withstanding the forces which are applied thereto and in particular the thrust or bottom effect against the walls of the groove in which it is fitted and against the oppositely-facing clamping flange.

Further properties of a flexible annular seal embodying the improvement under consideration will also become apparent from the following description of two examples of construction which are given by way of indication and not in any limiting sense, reference being had to the accompanying drawings, wherein.

Figure 1:
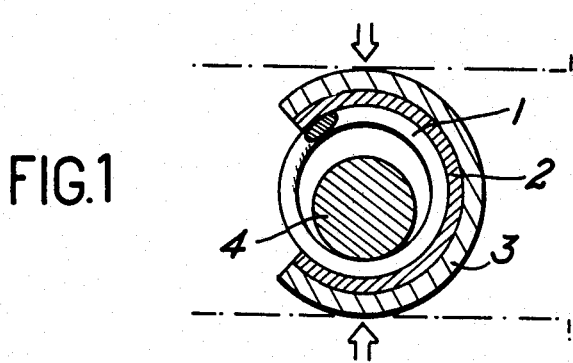
FIG. 1 is a schematic transverse sectional view of the seal in accordance with the invention, the seal as illustrated being fitted with an internal rigid reinforcement strip.

The seal which is illustrated in transverse cross-section in FIG. 1 comprises in the manner which was indicated in the main patent three main elements and especially an internal core constituted by a metallic helical spring 1 which is preferably of stainless steel or the like, said spring being provided with contiguous turns in a completely closed configuration, a first sheath 2 of non-ductile metal such as mild steel and a second sheath 3 surrounding the first and formed of ductile metal such as aluminum, for example. The spring 1 is fitted within the sheath 2 which is in turn fitted within the sheath 3; the sheaths 2 and 3 have the shape of toric surfaces, the generating circles of which each have a break in continuity, with the result that the internal spring 1 of the seal is not completely enclosed within said sheaths.

In accordance with the invention, the seal thus formed comprises a rigid metallic reinforcement strip 4 which is mounted within the interior of the spring 1. Said strip is preferably formed of steel or of any other suitable material having a high degree of rigidity in order that it may be permitted in particular to withstand high compressive stresses. Said internal reinforcement strip 4 has a circular transverse cross-section and a diameter which is smaller than the internal diameter of the spring 1. Said strip therefore permits the possibility of displacement of the spring in compression but nevertheless limits this displacement from the point of tangential contact between the ovalized cross-section of the deformed spring and the circular cross-section of the reinforcement strip which is substantially non-deformable by virtue of its inherent rigidity.

Figure 2:
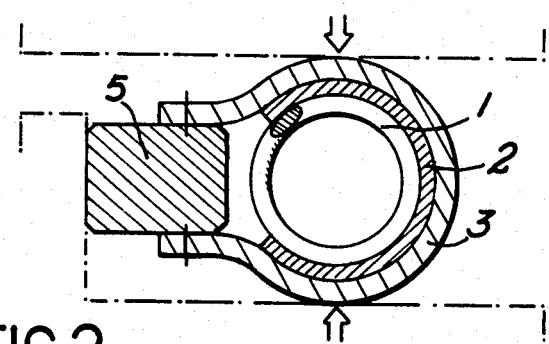
FIG. 2 is a schematic sectional view of an alternative form of construction in which the rigid reinforcement strip is placed outside the spring.

In the alternative form of construction which is illustrated in FIG. 2, there is again shown the internal spring 1 together with its two sheaths 2 and 3 respectively. In this case, however, the reinforcement strip 5 which is capable of cooperating with the spring 1 at the time of displacement of this latter in compression under the action of clamping between contact surfaces (not shown in the drawings) is constituted by a flat ring mounted in contact with the spring 1 but located outside this latter. Said ring forms a lateral bearing member for the spring within the interior of the outer sheath 3, said sheath being suitably extended so as to cover the reinforcement strip 5 at least partially. As in the example illustrated in FIG. 1, compression of the seal under the action of the forces applied thereto ensures abutting contact of the flanges against the reinforcement strip 5 which is itself non-deformable. In this alternative form of construction, the thickness of the reinforcement strip 5 is chosen so as to ensure a sufficient displacement of the spring 1 in compression.

Figure 3:
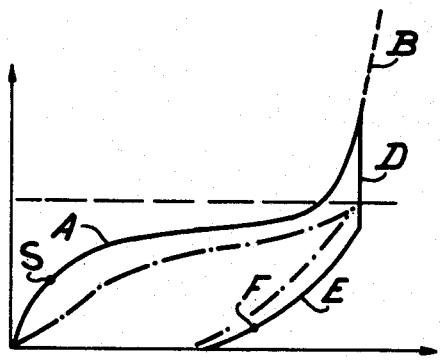
FIG. 3 is a diagram representing the application and removal of compression loads on a seal in accordance with the improvement under consideration in a system of coordinates in which the applied forces are plotted as ordinates and the displacements in compression are plotted as abscissae.

Referring now to FIG. 3, one may discern the mode of application of the diagram which represents the behavior of the seal associated with its rigid reinforcement strip for limiting the deformation of this latter. In this diagram, the displacement in compression is plotted as abscissae and the compressive force applied to the seal is plotted as ordinates.

As the load on the seal increases, so the displacement of this latter in compression as represented by the portion A of the curve takes place in a progressive manner; on the other hand, as soon as the internal spring comes into contact with the rigid reinforcement strip, the slope of the portion B of the curve shown in the diagram becomes much steeper. When the force applied to the seal is removed, the recovery of the seal corresponds first to a straight portion D corresponding to zero recovery and then to elastic recovery in the portion E. The cycle which is thus plotted and in which the reference S corresponds to the threshold of leak-tightness and the reference F corresponds to the threshold of leakage or loss of leak-tightness can be compared with the diagram given in the prior application No. 280,952 and illustrated in chaindotted lines in FIG. 3 of the present invention with a view to highlighting the more attractive possibilities offered by the seal and especially its capacity for withstanding yigher values of stress without impairing its elastic recovery.

The presence of the rigid reinforcement strip associated with the internal spring improves the resistance of this latter to high clamping forces and also dispenses with the need to machine grooves in the flanges to be sealed without thereby affecting the relative positioning of these latter. Furthermore, the presence of the rigid strip permits the use of springs which may in turn possess relatively limited rigidity provided that the requisite conditions of fluid-tightness are satisfied, the intended function of the strip being to confer a sufficient degree of stiffness even on seals of large size. As a consequence, flange assemblies which are capable of accommodating this type of seal can be reduced dimensionally and can themselves have higher values of inherent flexibility. The presence of the rigid strip additionally makes it possible to extend the range of pressures to which the flexible metallic seal is subjected by enabling this latter to sustain the thrust exerted by the clamping flanges during the high-rigidity portion of the compression cycle. Finally, the reinforcement strip makes it possible to combine the advantages of a seal having high rigidity with those of a flexible metallic seal which provides elastic recovery and compensates for the defects of shape and surface which are encountered in practise.

It should be clearly understood that the present invention is not limited to the examples which have been more especially described with reference to the drawings but extends to any alternative forms of construction. In particular, the rigid reinforcement strip need not be limited to the function of a bearing member for the spring but can also play the part of a centering member. This is especially applicable when the strip is used in a seal which has a generally bi-annular shape, in which case the reinforcement strip or compression-limiting member is preferably placed between the two toric portions of the seal.

What is claimed is:

1. An annular seal comprising a central core of a metal wire helical spring with continuous turns and high axial compressive stressing closed on itself and torroidal in shape in the inoperative state, a first resilient hard metal envelope substantially covering the outer surface of the spring and having in the inoperative state the shape of a torroidal surface whose generating circle includes a gap, a second independent envelope of ductile metal substantially covering the outer surface of the first envelope and having in the inoperative state the form of a torroidal surface whose generating circle includes a gap substantially co-extensive with the first gap, and a rigid metallic reinforcement strip mounted against the spring inside the first envelope.

2. An annular seal according to claim 1, wherein the rigid reinforcement strip is mounted inside the spring.

3. An annular seal according to claim 1, wherein the rigid reinforcement strip is mounted outside the spring.

4. An annular seal according to claim 1, wherein the rigid reinforcement strip is continuous.

5. An annular seal according to claim 1, wherein the rigid reinforcement strip is non-continuous.

6. An annular seal according to claim 1, wherein the rigid reinforcement strip has a diameter which is smaller than the diameter of the spring and a thickness which is compatible with the desired displacement of said spring in compression.

* * * * *